Oct. 3, 1950   W. D. SMITH   2,524,143
EDUCATIONAL ART AND APPARATUS
Filed Jan. 8, 1948   2 Sheets-Sheet 1

Willard D. Smith,
Inventor.
Haynes and Koenig
Attorneys.

Oct. 3, 1950 W. D. SMITH 2,524,143
EDUCATIONAL ART AND APPARATUS
Filed Jan. 8, 1948 2 Sheets-Sheet 2

Willard D. Smith,
Inventor.
Haynes and Koenig,
Attorneys.

Patented Oct. 3, 1950

2,524,143

UNITED STATES PATENT OFFICE 2,524,143

EDUCATIONAL ART AND APPARATUS

Willard D. Smith, Bucks County, Pa.

Application January 8, 1948, Serial No. 1,117

13 Claims. (Cl. 35—35)

This invention relates to educational art and apparatus, and with regard to certain more specific features, to the art and apparatus for educating children to read.

Among the several objects of the invention may be noted the provision of a method and apparatus for expediting the education of children in the recognition of the meanings of words, punctuation, and the reading and understanding of sentences involving them; the provision of an art and apparatus of the class described which will take advantage of a child's natural sense of rhythm for expediting the learning process; the provision of an art and apparatus of this class which takes advantage of several coordinated sense perceptions so as to minimize chances of forgetting; and the provision of an art and apparatus of this class which, independently of extended personal guidance, will entertainingly sustain interest long enough to obtain the desired results. Other objects will be in part apparent and in part pointed out hereinafter.

The invention accordingly comprises the elements and combinations of elements, steps and sequence of steps, features of construction and manipulation, and arrangements of parts which will be exemplified in the structures and methods hereinafter described, and the scope of the application of which will be indicated in the following claims.

Figure 1:
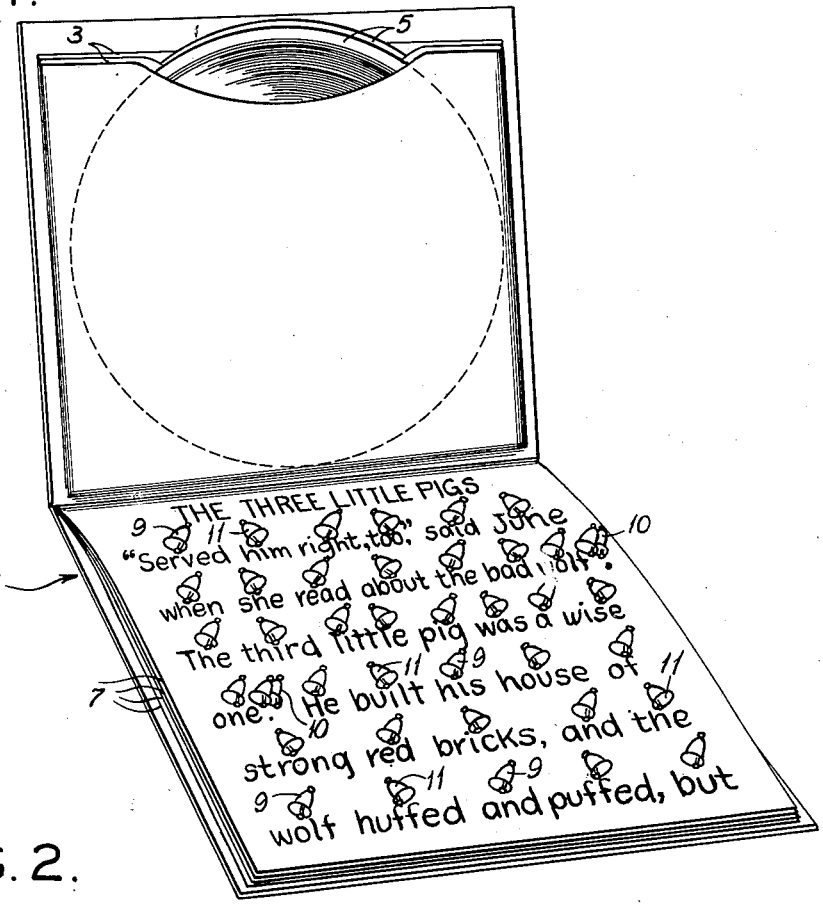
Figure 2:
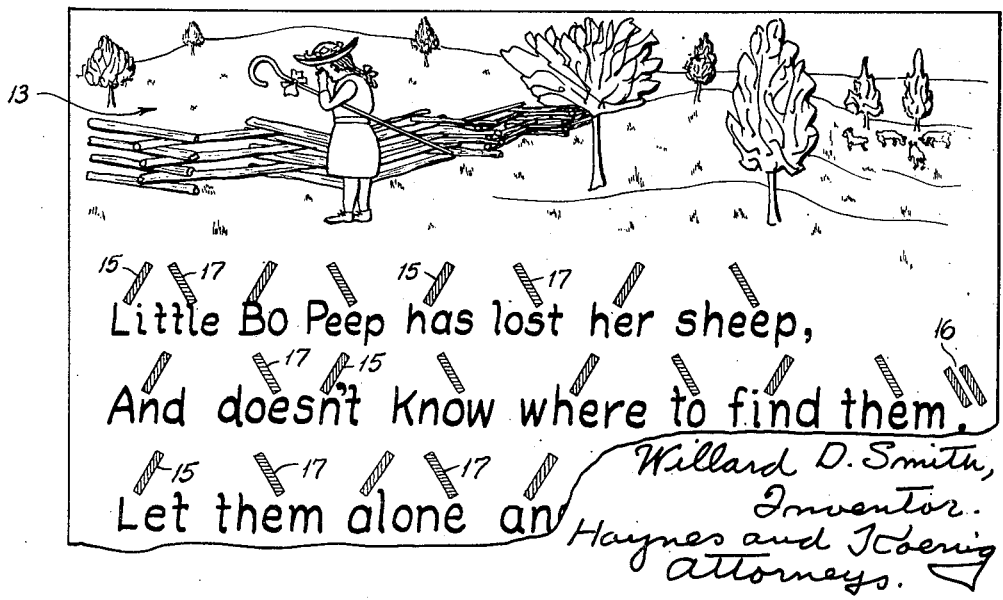
Figure 3:
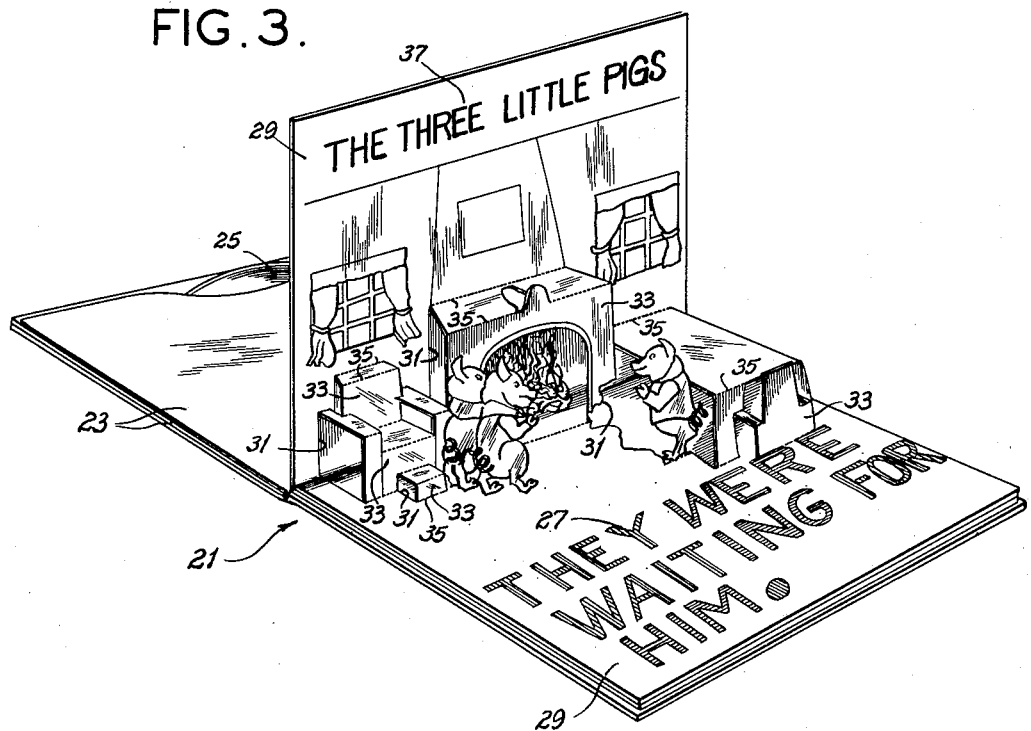

In the accompanying drawings, in which several of various possible embodiments of the invention are illustrated, Fig. 1 is a perspective view of a book embodying the invention;

Fig. 2 is a plan view of a single book page illustrating alternative aspects of the invention wherein two-dimensional illustrations are employed; and, Fig. 3 is a perspective view of another alternative form of the invention employing tridimensional illustrations.

Similar reference characters indicate corresponding parts throughout the several views of the drawings.

By modern teaching methods, children are taught to read in terms of complete word recognition, that is, by synthesis rather than analytically in terms of the letters of which the words are composed. The present invention takes advantage of this method and extends it by extending the synthesis to whole sentences and groups of sentences. It is known that children respond with interest to rhythmical phenomena, both visual and oral, this response being quite natural and tending to lower tension, reduce inhibitions and the like. By means of the present invention, visual and oral rhythms are coordinated so as automatically to bring about the learning process with a minimum of supervision.

Referring now more particularly to the drawings, numeral 1 indicates a child's entertainment album or book in which are pockets 3 for records 5. Bound in with the pockets are pages 7. On the pages 7 and pockets 3 are printed or written the words of preferably (though not necessarily) familiar stories which may be in prose or rhyme. Cut into the respective records are sound tracks corresponding to the visual material. The written material is grouped according to the grouping of sound forms on the records. For example, several pages may carry the story of "The Three Little Pigs." This corresponds to this same story cut in the sound track on one or both sides of a record. The records may be of any acceptable type, but preferably the non-breakable, plastic, wafer type is used.

Care is taken that the grammar, syntax, syllabication, intonation, enunciation and the like used in preparing the records are proper. A "sing-song" presentation is avoided but the sound track of words is produced with a coordinated rhythmical background sound, preferably (though not necessarily) of the percussion or beat type. The sounding of the beat is produced rhythmically in coordination with the words when they are short enough, and with the syllabication of the words if they are long. Preferably a beat is musically intoned, but the words are not sung musically. For example, a bell may be intoned as a background sound as each word or syllable is uttered. The bell pitch may be constant or it may alternate between lower and higher values on successive soundings of the bell to indicate down and up beats, or it may vary according to any other rhythmic harmony pattern. Two-four $$\left(\frac{2}{4}\right)$$

time, such as used in music, is a satisfactory rhythm, although others may be employed if desired.

Care is taken in the case of the printed words of spelling, syllabication, punctuation, etc. The words printed on the pages are provided with indicia of bells, as indicated in Fig. 1, according to syllables and punctuation. These indicate the bells in successively alternate positions in association with the printed words. Thus, in the case of the words shown in Fig. 1, the indicia 9 alternate with the indicia 11, the former showing a bell sloping in one direction with the clapper striking it one way to indicate a down beat, and the latter showing the same bell sloping in another direction with the clapper striking it in the alternate way to indicate an up beat. Thus the indicia constitute an alternating visual sequence of bell positions corresponding to the repeating intonations of the bell on the record. At all punctuation points requiring pauses, such as periods, semicolons, etc., the indicia are distinctively duplicated to accord with duplication of the sound signals at these points. In Fig. 1, two bells are shown over the period. This corresponds to two bell beats on the record. The two bells are marked 19.

In view of the above, it will be clear that in certain broad aspects the invention comprises the art of word and sentence instruction by providing a 1:1 correspondence between coordinated sound and sight rhythms coordinated respectively with a sound track and visible sentence structures. The nature of the sound rhythm and of the corresponding serially presented indicia is such that they preferably represent the same thing, in the present example a bell. It is to be understood, however, that the rhythmic sound and indicia may represent something else, such as for example a drum beat, cymbal, or the action of a baton or the like. Also, the printed indicia may be distinguished from one another by color as well as position, or by color only. It is to be noted that the oral words from the record and the printed words associated with the rhythmic sounds and indicia are themselves the same, being merely presented through different senses, namely, the ear and the eye.

In Fig. 2 is shown an alternative embodiment. This is a single page from a book which it is to be understood otherwise includes pockets for appropriate records, as already made clear. In this case an illustration of the story being taught is also included. This is shown at numeral 13. By this means the generalized meaning of the story is presented. In the form shown in Fig. 2, the indicia are shown at 15 and 17 and consist simply of bars illustrating a baton in alternate positions. These are also alternately colored red and blue, as indicated by the vertical and horizontal crosshatching, respectively. The corresponding background percussions on the record used for this story are simple percussion beats, such as might be obtained by tapping a baton on a hard surface. Two batons (on the page) and two beats (on the record) correspond to a period or other punctuation, (see numeral 16 at the end of the sentence). A variation is to indicate drum sticks with drum beats as background sound on the record. This is appropriate for a marching theme or the like.

It is to be understood that color alone might be used for making alternate symbols above the printing without indication of the alternate positions. For example, alternately colored circles could be used in the appropriate positions.

Fig. 2 illustrates another point in connection with the words "little" and "doesn't." In these and similar cases, alternate beats are used to indicate syllabication within a word.

In Fig. 3 is shown how the coordinated illustrations may be carried out in three-dimensional form. In this case the book as a whole is shown at 21 and consists in a pocket section 23 for records such a indicated at 25. In this case the story is printed, as shown at 27, on what may be considered the top of a relatively stiff leaf. The leaves 29 are of pasted multi-ply form with the top ply relieved and cut out, as indicated at lines 31, so as to relieve movable portions 33 which are scored at various points, as shown at 35. Hence when a leaf such as 29 is set at right angles as shown, the portions 33 are angled into outstanding positions such as shown. This makes a three-dimensional presentation of the illustration. The title of the story may be placed at a point such as 37. In this case is illustrated the point that the printed beat symbols may be incorporated with the words or word syllables by variable coloring of these per se. For example, the hatching on the letters of Fig. 3 indicates this. In the sentence, "They were waiting for him.", the word "They" is red; the word "were" is blue; the word syllable "wait" is red; the syllable "ing" is blue; the word "for" is red; and the word "him" is blue. The final period is red. The corresponding beat in the record may be any appropriate background sound, such as a tap.

Use of the invention is as follows: A child receiving the book, which includes the records in its pockets, is preliminarily instructed to place the record on a suitable sound reproducer. The child is then instructed to the effect that the background rhythmic sounds correspond to the variable indicia, either as to position or color or both. Quickly the child associates the rhythmic sounds and rythmically presented indicia and thereby associates the corresponding spoken and written words and syllables. Thus it visually learns the words which it audibly hears. It also quickly learns proper punctuation from the double or multiple beats. Meanings of any words of which it has not theretofore been cognizant are suggested by the illustrations; or, if such are not used, it can be assumed that the meanings have been supplied therebefore by the parent, teacher or the like. In such event, the device serves to provide repetitive drill which quickly implants the word in the memory both as to proper pronunciation and visual presentation. The repetition is not tiresome because it is self-imposed by the child in repeating the fun of playing the record and reading the text and illustrations.

In view of the above, it will be seen that the several objects of the invention are achieved and other advantageous results attained.

As many changes could be made in the above constructions and methods without departing from the scope of the invention, it is intended that all matter contained in the above description or shown in the accompanying drawings shall be interpreted as illustrative and not in a limiting sense.

I claim:

1. A method of teaching reading comprising simultaneously acoustically sounding words and beats, and typographically presenting words and related indicia corresponding respectively to the acoustically sounded words and beats, the typographical indicia and acoustically sounded beats being adapted to identify a common percussion instrument.

2. A method of teaching reading comprising simultaneously acoustically sounding non-musical words and musical beats, and typographically presenting words and adjacent indicia corresponding respectively to the acoustically sounded words and beats, the typographical indicia and the acoustically sounded beats being adapted to identify a common musical percussion instrument.

3. Educational apparatus comprising a combined page book and record album, a page of the book containing a printed story, a record having a sound track recording said story in the same words as on the page in a 1:1 relation, said record having recorded beats simultaneous with the recorded words, and printed indicia on the page related to the words and corresponding to said beats.

4. Educational apparatus comprising a combined paged book and album for records, the pages of the book containing printed stories, the records having sound tracks non-musically recording said stories in the same words as on the pages in a 1:1 relation, and having musical recorded beats simultaneous with the recorded words, and alternately printed indicia on the pages adjacent to the words and corresponding to said beats.

5. Educational apparatus comprising a combined paged book and record album, the pages of the book containing printed stories consisting of words and punctuation, the records having sound tracks recording said stories in the same words as on the pages in a 1:1 relation, and having pauses in a 1:1 relation to the punctuation, and having recorded beats simultaneous with the recorded words, indicia adjacent the printed words corresponding to said beats, and other indicia adjacent the punctuation corresponding to said pauses.

6. Educational apparatus comprising a combined paged book and record album, the pages of the book containing printed stories consisting of words and punctuation, the records having sound tracks recording said stories in the same words as on the pages in a 1:1 relation, and having recorded beats simultaneous with the recorded words and pauses in a 1:1 relation to the punctuation, indicia adjacent the printed words corresponding to said beats, other indicia adjacent the punctuation corresponding to said pauses, and illustrations on the pages coordinated with the stories and illustrating them.

7. Educational apparatus comprising a combined paged book and record album, the pages of the book containing printed stories consisting of words and punctuation, the records having sound tracks recording said stories in the same words as on the pages in a 1:1 relation, and having recorded beats simultaneous with the recorded words and pauses in a 1:1 relation to the punctuation, indicia adjacent the printed words corresponding to said beats, other indicia adjacent the punctuation corresponding to said pauses, and illustrations on the pages coordinated with the stories and illustrating them, said illustrations comprising scored and foldable portions between pages adapted to assume three-dimensional attitudes upon opening the pages.

8. In the art of teaching reading, the organized provision of a page bearing visual words and visual beat indicia, at least one for each word, visually associated with the respective words, and a sound recording of the words on the page with a background of audible beats simultaneous with the words and corresponding to the beat indicia on the page.

9. In the art of teaching reading, the organized provision of a page bearing visual words and visual beat indicia, at least one for each word, visually associated with the respective words, and a sound recording of the words on the page with a background of audible beats simultaneous with the words and corresponding to the beat indicia on the page, the visual beat indicia and the audible beats relating to a common instrumentality.

10. In the art of teaching reading, the organized provision of a page bearing visual words and visual beat indicia, at least one for each word, visually associated with the respective words, and a sound recording of the words on the page with a background of audible beats simultaneous with the words and corresponding to the beat indicia on the page, the visual beat indicia and the audible beats relating to a common instrumentality, successive visual beat indicia denoting alternate positions of said instrumentality.

11. In the art of teaching reading, the organized provision of a page bearing worded sentences and visual beat indicia, at least one for each word, adjacent the respective words for visual association therewith, and a sound recording of the words on the page with a rythmical background of audible beats simultaneous with the words and corresponding to the beat indicia on the page.

12. In the art of teaching reading, the organized provision of a page bearing worded, punctuated sentences and visual beat indicia visually associated with the syllables of the words and at least some of the punctuation marks, there being a beat index for each syllable and at least some of said punctuation marks, and a sound recording of the sentences on the page with a rythmical background of audible beats corresponding to the beat indicia on the page, the recorded beats being simultaneous with the respective recorded syllables and the pauses corresponding to the punctuation marks.

13. In the art of teaching reading, the organized provision of a page bearing worded, punctuated sentences and visual beat indicia visually associated with the syllables of the words and at least some of the punctuation marks, there being a beat index for each syllable and at least some of said punctuation marks, and a sound recording of the sentences on the page with a rythmical background of audible beats corresponding to the beat indicia on the page, the recorded beats being simultaneous with the respective recorded syllables and the pauses corresponding to the punctuation marks, the audible beats corresponding to syllables being audibly distinct from the audible beats corresponding to punctuation marks.

WILLARD D. SMITH.

REFERENCES CITED

The following references are of record in the file of this patent:

UNITED STATES PATENTS

| Number | Name | Date |
| --- | --- | --- |
| 1,236,333 | Mayhew | Aug. 7, 1917 |
| 1,435,660 | Rogerson | Nov. 14, 1922 |
| 1,496,258 | Ewing | June 3, 1924 |
| 2,416,754 | Horr | Mar. 4, 1947 |

OTHER REFERENCES

Ser. No. 418,491, Routin (A. P. C.), published Apr. 27, 1943.